(12) United States Patent
Janik

(10) Patent No.: US 12,442,338 B2
(45) Date of Patent: Oct. 14, 2025

(54) MOBILE ELECTRIC FRACKING TRAILER POWER SUPPLY SYSTEM

(71) Applicant: Electronic Power Design, In, Houston, TX (US)

(72) Inventor: John Bradford Janik, Houston, TX (US)

(73) Assignee: Electronic Power Design, Inc., Houston, TX (US)

( * ) Notice: Subject to any disclaimer, the term of this patent is extended or adjusted under 35 U.S.C. 154(b) by 550 days.

(21) Appl. No.: 17/696,163

(22) Filed: Mar. 16, 2022

(65) Prior Publication Data

US 2022/0333536 A1    Oct. 20, 2022

Related U.S. Application Data

(63) Continuation-in-part of application No. 16/458,359, filed on Jul. 1, 2019, now Pat. No. 11,333,085, and a continuation of application No. 15/415,797, filed on Jan. 25, 2017, now Pat. No. 10,337,424.

(60) Provisional application No. 63/161,698, filed on Mar. 16, 2021.

(51) Int. Cl.
| | |
|---|---|
| F02D 25/00 | (2006.01) |
| B63B 21/50 | (2006.01) |
| F02D 41/00 | (2006.01) |
| F02D 41/26 | (2006.01) |
| G05B 15/02 | (2006.01) |
| E21B 41/00 | (2006.01) |

(52) U.S. Cl.
CPC .............. *F02D 25/00* (2013.01); *B63B 21/50* (2013.01); *F02D 41/0027* (2013.01); *F02D 41/26* (2013.01); *G05B 15/02* (2013.01); *B63B 2021/505* (2013.01); *E21B 41/0085* (2013.01); *F02D 2200/1002* (2013.01)

(58) Field of Classification Search
None
See application file for complete search history.

(56) References Cited

U.S. PATENT DOCUMENTS

| | | | |
|---|---|---|---|
| 5,319,556 A | 6/1994 | Bessacini | |
| 5,898,282 A | 4/1999 | Drozdz et al. | |
| 8,271,175 B2 | 9/2012 | Takenaka et al. | |
| 8,662,220 B2 | 3/2014 | Burkholder | |
| 8,670,888 B1 | 3/2014 | Brenner | |
| 9,129,456 B2 | 9/2015 | Keates et al. | |
| 9,140,110 B2 * | 9/2015 | Coli | B01F 23/43 |
| 9,836,574 B2 | 12/2017 | Willard et al. | |
| 10,648,311 B2 * | 5/2020 | Oehring | H02J 3/38 |
| 10,794,165 B2 * | 10/2020 | Fischer | F04B 47/02 |
| 10,801,311 B1 * | 10/2020 | Cui | E21B 43/2607 |
| 11,035,207 B2 * | 6/2021 | Oehring | E21B 43/2401 |
| 11,035,214 B2 * | 6/2021 | Cui | H02K 11/049 |
| 11,111,768 B1 * | 9/2021 | Yeung | E21B 43/2607 |
| 11,255,173 B2 * | 2/2022 | Coli | F04B 1/16 |
| 11,359,462 B2 * | 6/2022 | Morris | H02J 9/00 |
| 11,391,136 B2 * | 7/2022 | Coli | B01F 23/43 |

(Continued)

*Primary Examiner* — Jonathan M Dager
(74) *Attorney, Agent, or Firm* — G. Michael Roebuck, PC

(57) ABSTRACT

A system having an efracking trailer, a first low efficiency efracking six mega volt ampere (MVA) transformer attached to the efracking trailer; an efracking transformer core inside of the efracking transformer; and a cooling fan attached to the efracking trailer, wherein the cooling fan forces chilled air into the efracking transformer core.

19 Claims, 4 Drawing Sheets

(56) References Cited

U.S. PATENT DOCUMENTS

| | | | |
|---|---|---|---|
| 11,449,018 B2* | 9/2022 | Oehring | H02J 3/14 |
| 11,492,887 B2* | 11/2022 | Cui | H02K 11/049 |
| 11,578,577 B2* | 2/2023 | Hinderliter | F04B 17/03 |
| 11,629,584 B2* | 4/2023 | Yeung | F04B 9/02 |
| | | | 166/308.1 |
| 11,680,474 B2* | 6/2023 | Cui | H02K 7/1823 |
| | | | 290/1 R |
| 11,728,657 B2* | 8/2023 | Hinderliter | H02J 7/34 |
| | | | 307/84 |
| 11,802,468 B2* | 10/2023 | Publes | E21B 44/00 |
| 11,851,998 B2* | 12/2023 | Coli | B01F 35/3204 |
| 11,955,782 B1* | 4/2024 | Martin | H01F 38/00 |
| 2003/0107030 A1 | 6/2003 | Sozzi | |
| 2011/0074165 A1 | 3/2011 | Grimes et al. | |
| 2012/0255734 A1* | 10/2012 | Coli | H02K 7/1823 |
| | | | 166/305.1 |
| 2013/0175878 A1 | 7/2013 | Janik | |
| 2013/0241444 A1* | 9/2013 | Fotherby | H02J 3/34 |
| | | | 318/400.26 |
| 2013/0307444 A1* | 11/2013 | Settemsdal | B60L 7/14 |
| | | | 318/139 |
| 2013/0313894 A1 | 11/2013 | Settemsdal | |
| 2014/0197768 A1 | 7/2014 | Haugen et al. | |
| 2014/0239871 A1 | 8/2014 | Savva et al. | |
| 2015/0239546 A1 | 8/2015 | Limseth | |
| 2016/0009530 A1 | 1/2016 | Teruzzi | |
| 2016/0105022 A1* | 4/2016 | Oehring | H02J 3/14 |
| | | | 307/29 |
| 2016/0114862 A1 | 4/2016 | Janik | |
| 2016/0159625 A1 | 6/2016 | Janik | |
| 2016/0177678 A1* | 6/2016 | Morris | F02C 6/00 |
| | | | 60/772 |
| 2016/0207404 A1 | 7/2016 | Melz et al. | |
| 2016/0273328 A1* | 9/2016 | Oehring | E21B 43/2607 |
| 2016/0347421 A1 | 12/2016 | Janik | |
| 2016/0348479 A1* | 12/2016 | Oehring | F04B 49/20 |
| 2016/0369609 A1* | 12/2016 | Morris | F04B 9/02 |
| 2017/0037718 A1* | 2/2017 | Coli | B01F 27/05 |
| 2017/0203660 A1 | 7/2017 | He et al. | |
| 2017/0218727 A1* | 8/2017 | Oehring | F04B 49/20 |
| 2017/0234250 A1 | 8/2017 | Janik | |
| 2018/0156210 A1* | 6/2018 | Oehring | F04B 15/02 |
| 2018/0334177 A1 | 11/2018 | Myers | |
| 2019/0003329 A1* | 1/2019 | Morris | H01R 13/00 |
| 2019/0169971 A1* | 6/2019 | Oehring | E21B 43/2607 |
| 2019/0173295 A1 | 6/2019 | Morin | |
| 2020/0087997 A1* | 3/2020 | Morris | F01D 15/10 |
| 2020/0109616 A1* | 4/2020 | Oehring | F04B 17/03 |
| 2020/0109617 A1* | 4/2020 | Oehring | H02B 13/00 |
| 2020/0332784 A1* | 10/2020 | Zhang | H02K 7/116 |
| 2021/0025383 A1* | 1/2021 | Bodishbaugh | F04B 47/02 |
| 2021/0108489 A1* | 4/2021 | Shampine | E21B 41/0085 |
| 2021/0131409 A1* | 5/2021 | Cui | F04B 53/16 |
| 2022/0018234 A1* | 1/2022 | Reddy | F04B 23/04 |
| 2022/0056795 A1* | 2/2022 | Coli | F04B 23/04 |
| 2023/0155358 A1* | 5/2023 | Oehring | E21B 43/2607 |
| | | | 166/66.4 |
| 2023/0279762 A1* | 9/2023 | Cui | F04B 17/05 |
| | | | 290/1 R |
| 2023/0323786 A1* | 10/2023 | Hinderliter | H02J 3/46 |
| | | | 166/66.4 |
| 2024/0318532 A1* | 9/2024 | Oehring | E21B 41/0085 |

\* cited by examiner

MOBILE ELECTRIC FRACKING TRAILER POWER SUPPLY SYSTEM

CROSS REFERENCE TO RELATED APPLICATIONS

This patent application takes priority from U.S. Provisional Patent application Ser. No. 63/161,198 entitled A MOBILE ELECTRIC FRACKING TRAILER POWER SOURCE filed on 16 Mar. 2021 by Janik et al. This patent application also claims priority from U.S. Provisional Patent Application No. 62/286,705 by John B. Janik, entitled "System and Method for Energy Management Using Linear Programming", filed on Jan. 25, 2016, this patent application also claims priority from U.S. patent application Ser. No. 15/415,191 by John B. Janik, entitled "System and Method for Energy Management Using Linear Programming", filed on Jan. 25, 2017 and this patent application also claims priority from U.S. patent application Ser. No. 16/458,359 by John B. Janik, entitled "System and Method for Energy Management Using Linear Programming", filed on Jul. 7, 2019 also claims priority from U.S. patent application Ser. No. 14/558,489 filed on Dec. 2, 2014, now U.S. Pat. No. 9,365,265 by John B. Janik, issued on May 25, 2016 all of which are hereby incorporated by reference herein in their entirety.

STATEMENT REGARDING FEDERALLY SPONSORED RESEARCH OR DEVELOPMENT not applicable

THE NAMES FOR THE PARTIES TO A JOINT RESEARCH AGREEMENT not applicable

INCORPORATION-BY-REFERENCE OF MATERIAL SUBMITTED ON A COMPACT DISC not ap

BACKGROUND OF THE INVENTION

Electric fracking of oil fields requires power to operate fracking equipment. When utility power is insufficient for fracking powering equipment additional power is supplied by portable power generation vehicles.

FIELD OF THE INVENTION

The present invention is in the field of a mobile power generation station for electric fracking in an oil field.

DESCRIPTION OF RELATED ART INCLUDING INFORMATION DISCLOSED UNDER 37 CFR 1.97 AND 1.98

Not applicable

BRIEF SUMMARY OF THE INVENTION

An electric fracking power supply system having an efracking trailer, wherein the efracking trailer is two thirds smaller and lighter than a trailer for a standard high efficiency transformer trailer; a first low efficiency efracking six mega volt ampere (MVA) transformer attached to the efracking trailer, wherein the efracking transformer is one third the size and weight a high efficiency electrical 6 MVA transformer; an efracking transformer core inside of the efracking transformer; and a cooling fan attached to the efracking trailer, wherein the cooling fan forces chilled air into the efracking transformer core.

BRIEF DESCRIPTION OF THE DRAWINGS

The drawings presented herein are for illustrative purposes only and do not limit the scope of the claims. Rather, the drawings are intended to help enable one having ordinary skill in the art to make and use the claimed inventions.

DETAILED DESCRIPTION OF THE INVENTION

Figure 1:
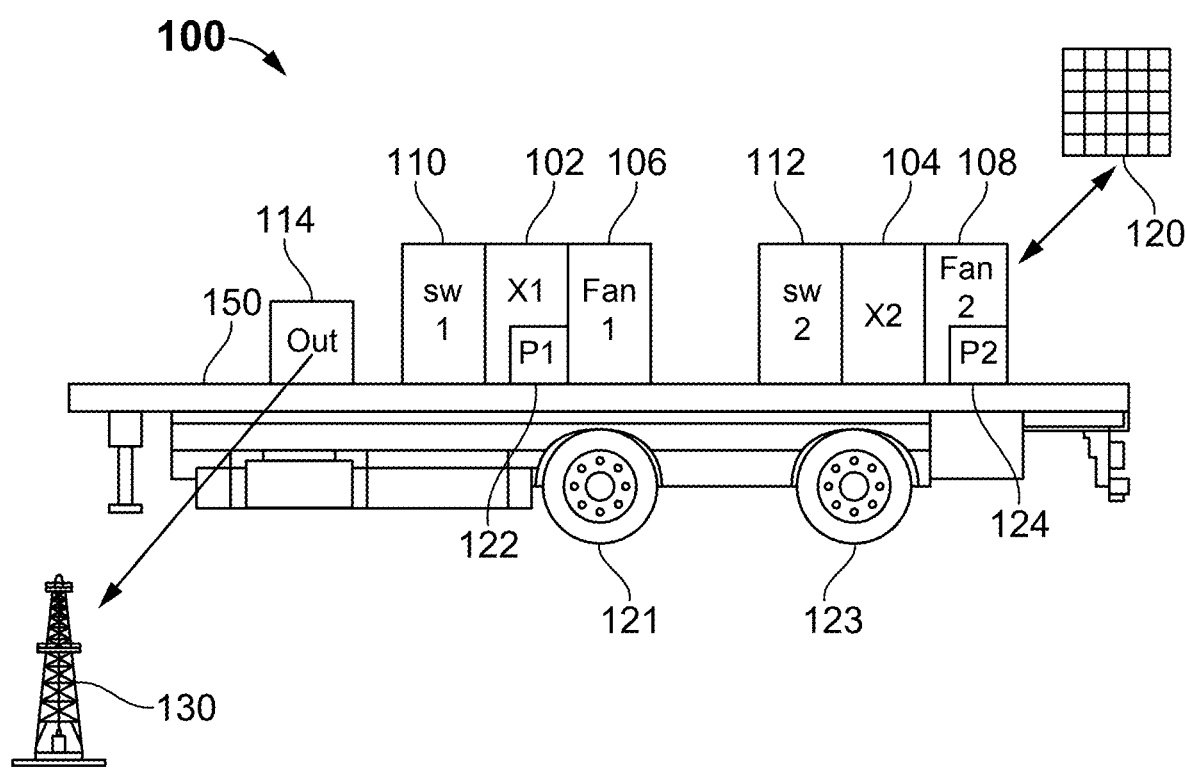
FIG. 1 is a schematic depiction of a particular illustrative embodiment of a mobile electrical fracking power supply.

A detailed description will now be provided. The purpose of this detailed description, which includes the drawings, is to satisfy the statutory requirements of 35 U.S.C. § 112. For example, the detailed description includes a description of inventions defined by the claims and sufficient information that would enable a person having ordinary skill in the art to make and use the inventions. In the figures, like elements are indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details, nor do they limit the scope of the claims.

In a particular illustrative embodiment of the invention a power generation vehicle is equipped with a small generator with large cooling fans to enable a smaller lighter power generation vehicle footprint. In a particular illustrative embodiment of the invention, a blown air water cooled high impedance transformer is provided for electric fracking. Typical installations use transformers that are selected based on the efficiency of the transformer. In a typical installation an ideal transformer has high efficiency, low noise, low impedance, and minimum voltage droop when loaded.

In an electric fracking environment, however, instead of the typical transfer selected for high efficiency, low noise, low impedance, and minimum voltage droop when loaded, it is more important that an electric fracking transformer be lighter and smaller taking precedence over typical high efficiency, low noise, low impedance, and minimum voltage droop when loaded of an ideal typical transformer.

In a particular illustrative embodiment of the invention, an electric fracking transformer (also referred to herein as an efracking transformer) is provided that is a lightweight transformer, having a less than ideal reduced efficiency, noise, impedance, and voltage droop is provided as a sealed water and air cooled on a mobile trailer for mobile power supply in an electric fracking.

A transformer's efficiency directly affects the transformer's performance and aging. The typical ideal or high efficiency transformer's efficiency, in general, is in the range of 95-99% and for large power transformers with extremely low losses, the efficiency can be as high as 99.7%.

Typically electric fracking has been performed using electric power from diesel engines and high efficiency electrical transformers, however, diesel engines are costly to operate, and high efficiency transformers are too large, heavy, and expensive to operate and maneuver in an oil field environment. Larger and heavier equipment often sinks in the soil of an oil patch and gets stuck. Thus, there is a need for a lighter smaller electrical transformer that can fit on trailer that is 50 percent shorter and 66 percent lighter than a prior art trailer required to carry a standard high efficiency electrical transformer in an oil field environment. For example, in a particular illustrative embodiment of the invention, a 15.24 meter (fifty foot), five axel trailer is required for a standard electrical transformer that weighs for example, 2267.962 kilograms (5,000 pounds) is reduced to a twenty-five foot, two axel trailer the weighs only 771.107 kilograms (1,700) pounds. In a particular illustrative embodiment of the invention the lighter and shorter trailer is easier to navigate between rigging equipment and other oil field equipment present in a land based oil field environment. In a particular illustrative embodiment of the invention the lighter trailer is less likely to become bogged down in soft soil.

In a particular illustrative embodiment of the invention an electric fracking transformer (hereinafter efracking transformer) is provided with a 70 percent efficiency efracking transformer, much lower than the 95+ percent efficiency prior art transformers used in a typical electrical fracking power supply installation. In another particular embodiment of the invention a efracking transformer with an 85 percent efficiency is provided, still significantly lower efficiency the 95+ percent efficiency transformers used in a typical prior art installation. In another particular embodiment of the invention the lower efficiency electric fracking transformer is placed in a sealed transformer housing and is cooled by water cooled chilled air forced by a high horsepower fan into the sealed efracking transformer housing. In a particular illustrative embodiment of the invention, ambient outside air is chilled by a water cooled radiator and high horse power air fan blower forces the chilled air into the efracking transformer. Efficiency of the high horse power fan is not a limiting factor in a land based electrical fracking operation so that a high horsepower fan can be provided on the efracking trailer. The electric fracking transformer is provided as an oversized horsepower blower to mitigate the reduced efficiency of the electric fracking transformer.

In another particular embodiment of the invention the efracking transformer, being lower efficiency, can cause has a voltage droop from 480 volts to 450 volts when the efracking transformer is fully loaded. An inverter attached to the output of the efracking transformer that corrects the voltage back up to 480 volts. Electrical harmonics, droop voltages and other harmful electrical effects created by the efracking transformer and inverter are mitigated and reduced by the larger inductance, L of the lower efficiency efracking transformer so that the harmonics and electrical noise are reduced by the higher impedance of the lower efficiency electrical fracking transformer and attenuated so that not propagated back into a weak rural electrical grid that supplies alternating current to the lower efficiency electric fracking transformer. The voltage waveform from the electric fracking transformer is fed to an inverter wherein transistors in the inverter compensate for the voltage droop from 480 volts to 450 volts.

In a particular illustrative embodiment of the invention, 45 degrees centigrade ambient air from a surrounding outdoor environment is chilled in a radiator and forced into air gaps formed in a core in the efracking transformer (also referred to herein as an Electric Fracking transformer) having an operating temperature of 175+ degrees centigrade. This operating environment represents a 130 degree centigrade heat differential which facilitates heat transfer from the efracking transformer. In a particular illustrative embodiment of the invention, a lower efficiency electric efracking transformer is provided having a smaller less efficient transformer core having air gaps and air pads between the efracking transformer core windings and the efracking transformer core to enable chilling 45 degree centigrade air to cool the efracking transformer down to less than 90 degrees centigrade to avoid burning 90 degree centigrade rated insulation on the core windings of the efracking transformer.

The smaller efracking transformer core makes a lower efficiency six mega volt ampere (MVA) electric fracking transformer 60 percent lighter than and 60 percent smaller than a standard higher efficiency 6 MVA transformer having a higher efficiency above 97 percent, thus facilitating a smaller electric fracking transformer footprint on a 66 percent smaller trailer that can more easily maneuvered in an electrical fracking operational environment in an oil patch. In another particular illustrative embodiment the lower efficiency electric fracking transformer is 60 percent lighter and 60 percent smaller than a standard higher efficiency 6 MVA transformer having a higher efficiency above 97 percent.

In a particular illustrative embodiment, the lower efficiency efracking transformer has a higher impedance than a standard higher efficiency transformer. Most of the higher impedance in the electric fracking transformer is inductance, L and to a lesser degree resistance, R. The increased efracking transformer inductance, L comes in part from a reduced magnetic coupling between the smaller efracking transformer core and the windings on the efracking transformer core, which are more separated from the efracking transformer core by the air pads that create air gaps between the efracking core windings and the efracking transformer core. The air gaps that facilitate cooling of the efracking transformer core but increase the inductance, L. The lower efficiency efracking transformer also uses smaller copper windings in the core, for example no. 18 American wire gage (AWG) copper windings instead of no. 14 AWG used in a standard higher efficiency 97 percent efficient transformers. In another particular embodiment of the invention, the cross-sectional area of the 18 AWG windings in the lower efficiency efracking transformer of the present invention is one-half the cross-sectional area of a 14 AWG core windings used in a 97 percent efficiency transformer. The smaller cross sectional area in the efracking 18 AWG transformer windings doubles the resistance of the windings and also doubles the $i^2$ R losses in the transformer core windings adding to the lower efficiency of the lower efficiency electric fracking transformer.

Additionally, in the lower efficiency efracking transformer of the present invention, mutual coupling inductance, L is greater than the mutual coupling inductance of a standard 97% efficiency transformer. The greater total inductance, L of the lower efficiency efracking transformer acts a harmonic "shock absorber" to retard and attenuate the effects of electrical harmonics and voltage droop created by the efracking transformer from being propagated back into to a weak rural electrical power grid to which the lower efficiency efracking transformer is typically connected. The lower efficiency efracking transformer's higher inductance, L experiences a higher voltage droop than a higher efficiency 97 percent but also is less disruptive to the power grid due to the higher inductance, L when fully loaded than a higher efficiency 97 percent transformer when fully loaded. A higher efficiency transformer would typically experience a voltage droop of 480 volts to 475 volt drop.

The lower efficiency efracking transformer is provided with air gaps in the core and between the core and insulated electrical copper windings so that air can be forced into the air gaps to cool the lower efficiency efracking transformer. The efracking transformer core winding insulation for the copper windings is rated at 90 degrees centigrade which is much lower than the copper wire. It is the insulation on the copper wire that must be cooled during operation of the efracking transformer so that the insulation does not melt during operation.

In a particular illustrative embodiment of the invention, the lower efficiency transformer is encased in a sealed housing and placed on a trailer along with the cooling equipment and inverter for suppling power to an electric fracking operation in an oil field.

Turning now to FIG. 1, in a particular illustrative embodiment of the invention an electrical fracking power supply system, including but not limited to a small footprint trailer 150 equipped with two six megawatt ampere (MVA) low efficiency efracking transformers 102, 104 are provided to create a twelve MVA power supply system. The efracking transformers include an inverter 110, 112 respectively that process power out of the efracking transformers 102, 104, respectively. Each efracking transformer is attached to a cooling fan 106, 108 respectively that each includes a water cooled radiator (not shown) that recirculates chilled water in a radiator that chills air from the cooling fans 106, 108. The chilled air from the cooling fans is forced into efracking transformers 102, 104. Each transformer 102, 104 is provided with a processor 122, 124 respectively that executes a computer program stored in a non-transitory computer readable medium within each processor the executes a linear program for controlling the operation of the cooling fans, the transformers, and the inverters for improved operation of the mobile efracking power supply system.

Figure 2:
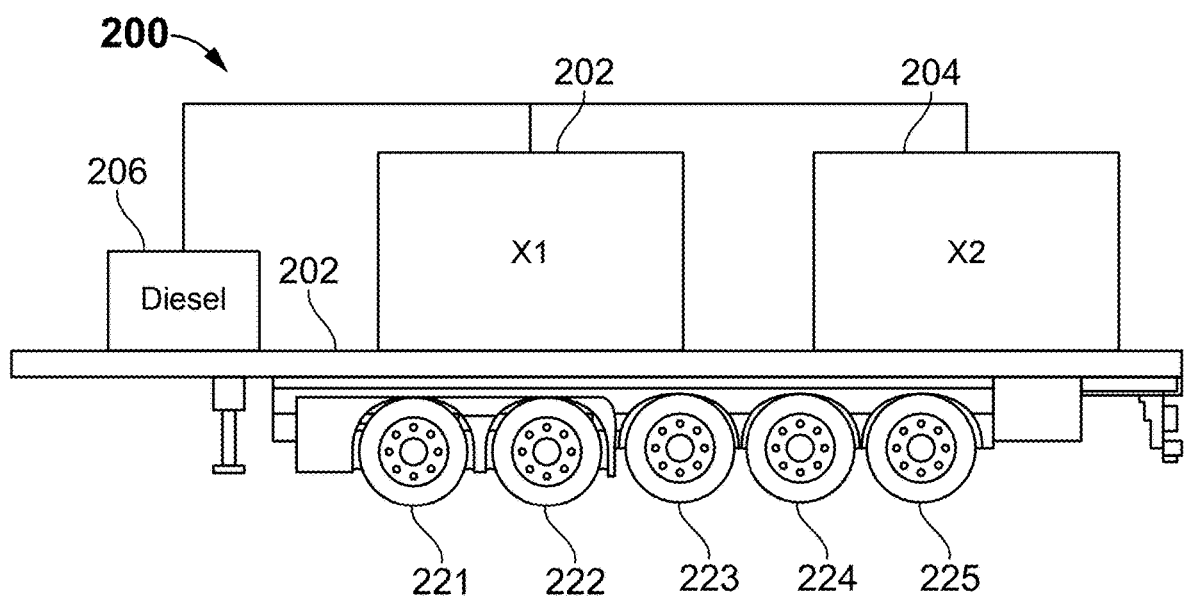
FIG. 2 is a schematic depiction of a prior art electrical fracking system power supply.

As shown in FIG. 1, in a particular illustrative embodiment of the invention, an efracking trailer 150 is provided, wherein the trailer is two thirds smaller and lighter than a trailer for a standard high efficiency transformer. A first low efficiency efracking 6 MVA transformer 102 attached to the efracking trailer 150, wherein the efracking transformer is one third the size and weight a high efficiency (95+ percent) electrical 6 MVA transformer 202 as shown in FIG. 2.

As shown in FIG. 1, an efracking transformer core inside of the efracking transformer and a cooling fan attached to the efracking trailer 150 are provided, wherein the cooling fan 106 forces chilled air into air gaps formed between the windings on the efracking transformer core and the surface of the efracking transformer core. The air gaps are formed by air pads onto which the efracking core windings are wound on to the air pads placed between the efracking transformer core and the surface of the efracking transformer core. In a particular illustrative embodiment of the invention, the efracking power supply system is attached to a typically vulnerable weak rural power utility grid 120 attached to an input of the first and second efracking transformers. Electrical fracking equipment is attached to an output of the mobile efracking power supply system. The electrical utility grid powers the mobile efracking power supply system 100. An output of the mobile efracking power supply system 100 is attached to an electrical fracking operation to power electrical equipment involved in the electrical fracking operation. In a particular illustrative embodiment of the invention number 18 American wire gauge (AWG) transformer windings are wound onto the efracking transformer core over and outside of the air pads placed on the efracking transformer core. Air gaps formed in the efracking transformer core are formed by spaces between air pads placed between the 18 AWG core windings and a surface of the efracking transformer core, wherein the cooling fan attached to the efracking trailer forces radiator chilled ambient air into the air gaps formed between the efracking transformer core and the efracking windings.

In a particular illustrative embodiment of the invention, the mobile efracking power supply system, the fans are a high horse power (20-50 horsepower) fans that force chilled air at 45 degrees centigrade onto the electric fracking core, which without cooling is at 175 degrees centigrade. In a particular illustrative embodiment of the invention the fans are fifty horse power fans. While the fifty horse power fans would not be used in a typical operating environment where electrical efficiency of a power supply system is a critical factor, where a fan requiring five horsepower is considered maximum allowable usage for cooling fans, the efficiency of the mobile efracking power supply system is not a factor so that 10, 20 and even fifty horsepower cooling fans are used. An inverter including but not limited to a diode rectifier 110, 112 is attached to the efracking transformers 102, 104 respectively, that corrects for voltage droop created by the electric fracking transformer when operating under load.

The increased distance formed by the air gaps between the efracking transformers core surface and core winding over the air pads increases the inductance, L of the efracking transformer. The increased inductance, L of the efracking transformer acts as an electrical transient buffer between the harmonics and other undesired electrical noise created by the efracking power supply system efracking transformers, to protect, mitigate and attenuate the electric utility grid from substantial voltage droops, from 480 volts down to 450 volts from propagating back into the electrical utility grid which in rural areas where efracking operations typically occurs can bring down the weak electrical utility grid.

As show in FIG. 1, a second low efficiency efracking transformer 140 is provided in the mobile efracking power supply system. Processors 122 and 124 attached to the first and second efracking transformers 102, 104, respectively. The processors further comprise a non-transitory computer readable medium (not shown) containing a computer program comprising instructions that executed by the processor. In a particular illustrative embodiment of the invention the computer program is a linear program that adjusts the output of the first and second efracking transformers based on a load attached to the first and second efracking transformers. In a particular illustrative embodiment of the invention the computer program is a linear program that adjusts the output of the cooling fans attached to the first and second efracking transformers based on a load attached to the first and second efracking transformers. The reduced weight and size of the mobile efracking trail enables the trailer to require only two wheels/axels 121, 122.

Turning now to FIG. 2, a prior art diesel powered electrical fracking power supply system is depicted. The prior art system is powered by a diesel engine generator 206. A first high efficiency transformer 202 is three times the size and weight of the efracking transformer 102 shown in FIG. 1. A second high efficiency transformer 204 is three times the size and weight of the efracking transformer 104 shown in FIG.

1. As shown in FIG. 2, the prior art trailer 202 is longer and heavier than the efracking power supply system shown in FIG. 1, and requires five axels/wheels 221, 222, 223, 224 and 225 instead of two axels for the illustrative embodiment of the invention shown in FIG. 1.

Figure 3:
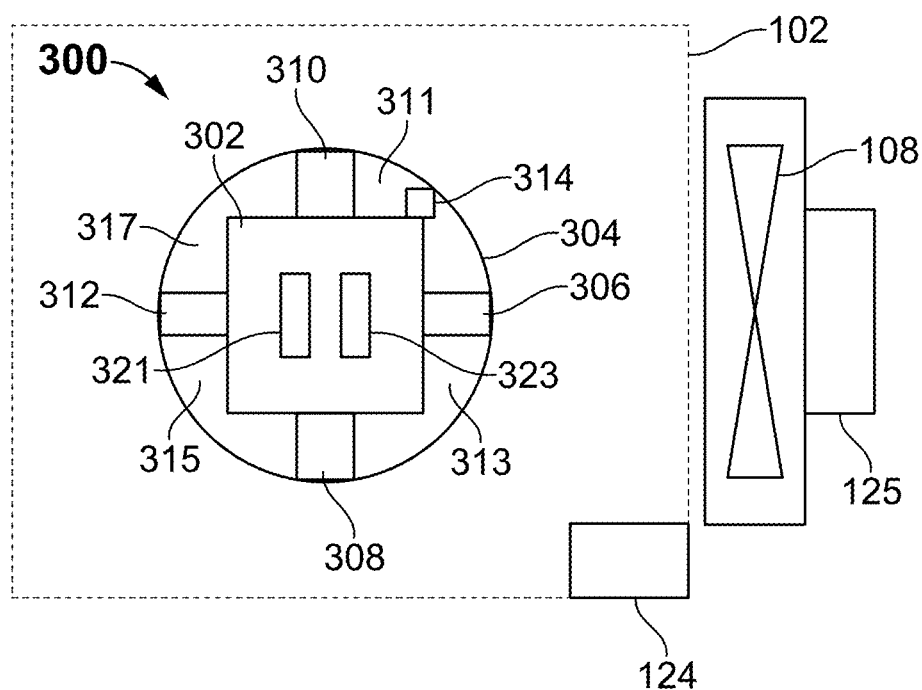
FIG. 3 is a schematic depiction of an illustrative embodiment of the invention.

Turning now to FIG. 3, the heat generated by the transformer 102 is cooled by the forced air generated by fan 124. The fan forces high velocity chilled air into on the core 302 and air gaps 311, 313, 315 and 317 between and the windings 304 of the efracking transformer core and the core, wherein the windings are separated from the transformer core by air pads as the core windings are wound around the transformer core on the air pads 310, 312, 308, 306 and 314. Air is also forced into the gaps 321 and 323 formed in the efracking transformer core.

The linear program in the processor computer readable medium determines an operating state for the first transformer 102 and second transformer 104, based on the load on the first transformer, the load on the second transformer, the temperature of the first transformer, the temperature of the second transformer, the temperature of the chilled air from first chiller 125, the temperature of the chilled air from the second chiller for the fan 108. The linear program adjusts the operating state of the mobile efracking power supply system based on the temperature of chilled air from first chiller 125 and second chiller 127 speed of first fan 108 and second fan 106, temperature of first transformer core 302 and second transformer core 304 (inside second 104 transformer, not shown) and a load on first transformer 102 and second transformer 104 to achieve increased efficiency of the mobile efracking power supply system.

Figure 4:
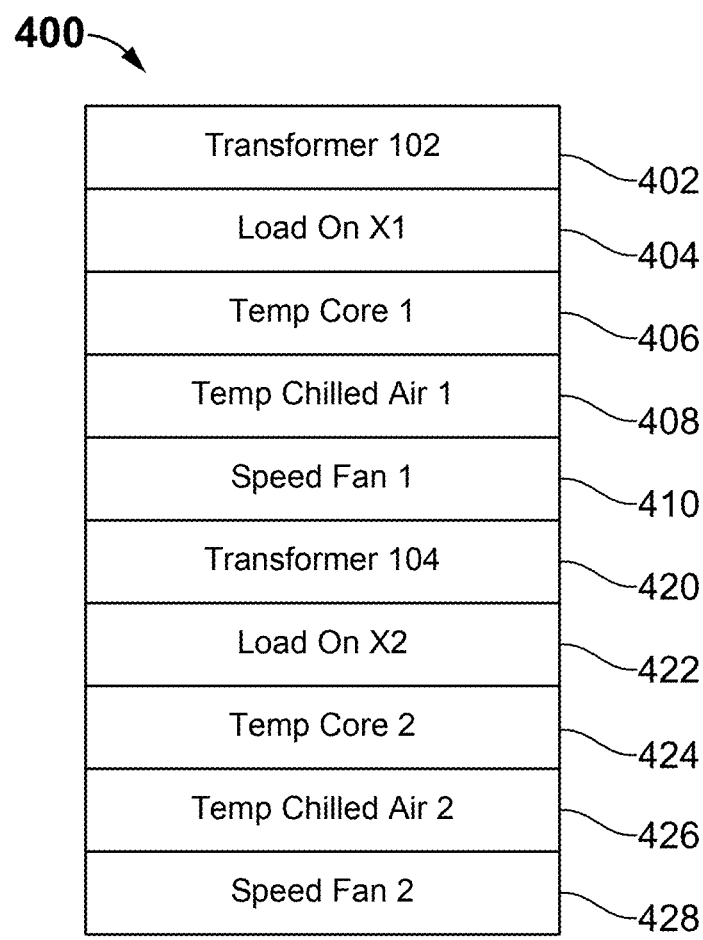
FIG. 4 is a depiction of a data structure in an illustrative embodiment of the invention.

Turning now to FIG. 4, as shown in FIG. 4 an operating state for the first and second transformers is stored in a data structure 400 in the computer readable medium. As shown in FIG. 4 the operating state for transformer 102 is stored as data values in the data structure fields as follows. A data identifier for transformer 102 stored in data structure field 402. A data value for a load measured on transformer 102 is stored in data structure field 404. A data value for a core temperature measured on transformer 102 is stored in data structure field 406. A data value for a chilled air from chiller 127 is stored in data structure field 408. A data value for a speed of fan 106 is stored in data structure field 410.

A data identifier for transformer 104 stored in data structure field 420. A data value for a load measured on transformer 104 is stored in data structure field 422. A data value for a core temperature measured on transformer 104 is stored in data structure field 424. A data value for a chilled air from chiller 125 is stored in data structure field 426. A data value for a speed of fan 108 is stored in data structure field 428.

The linear program adjusts the operating state of transformer 102 and 104 to achieve a substantially optimal efficiency of the mobile efracking power supply system during operation of the efracking power supply system.

The present invention provides a controller having a "Linear Algebra" (also referred to as herein as "Linear" and "Linear Programming") computer program stored in a non-transitory computer readable medium, wherein the Linear Algebra, or the solutions to simultaneous non-equalities, to yield substantially improved efficiency for a mobile efracking power supply system.

A tutorial and description of the use of linear programming that can be adapted and used in one particular illustrative embodiment of the present invention is described in the book Linear programming, by Vasek Chvatal, W. H. Freeman and Company, New York, 1983. An example how to use of using linear programming to find an optimal fuel mixture for each generator at each time period and under each scenario using linear programming; and repeating the previous two steps as long as the fuel mixture obtained from the linear programming solution changes is shown in U.S. Pat. No. 6,021,402 to Takriti, which is hereby incorporated herein by reference in its entirety.

In a particular illustrative embodiment of the invention, an electric fracking power supply system is disclosed including but not limited to an efracking trailer, wherein the trailer is two thirds smaller and lighter than a trailer for a standard high efficiency transformer trailer; a first low efficiency efracking six mega volt ampere (MVA) transformer attached to the efracking trailer, wherein the efracking transformer is one third the size and weight a high efficiency electrical 6 MVA transformer; an efracking transformer core inside of the efracking transformer; and a cooling fan attached to the efracking trailer, wherein the cooling fan forces chilled air into the efracking transformer core. In another particular illustrative embodiment of the invention. In another particular illustrative embodiment of the invention the electric fracking power supply system of claim 1, further includes but is not limited to a power utility grid attached to an input of the efracking transformer; and an electrical fracking equipment attached to an output of the efracking power supply system. In another particular illustrative embodiment of the invention number 18 American wire gauge transformer windings are wound onto the efracking transformer core.

In another particular illustrative embodiment of the invention, air gaps are formed in the efracking transformer core, wherein the cooling fan attached to the efracking trailer forces chilled air into the air gaps formed in the efracking transformer core. In another particular illustrative embodiment of the invention the fan is a high horse power fan that blows outdoor ambient air at 45 degrees centigrade onto the electric fracking core at 175 degrees centigrade.

In another particular illustrative embodiment of the invention the electric fracking power supply system of claim 1, further includes an electric utility grid that supplies alternating current to the electric fracking trailer. In another particular illustrative embodiment of the invention further includes but is not limited to a diode rectifier that corrects for voltage droop created by the electric fracking transformer.

In another particular illustrative embodiment of the invention, the mobile efracking power supply system further includes a second low efficiency efracking transformer is and a processor attached to the first and second efracking transformers, the processor further comprising a non-transitory computer readable medium containing a computer program comprising instructions that executed by the processor. In another particular illustrative embodiment of the invention, the mobile efracking power supply system further includes wherein the computer programs further comprises a linear program that adjusts the output of the first and second efracking transformers based on a load attached to the first and second efracking transformers.

In another particular illustrative embodiment of the invention, the mobile efracking power supply system further includes the computer program further comprises a linear program that adjusts the output of the cooling fans attached to the first and second efracking transformers based on a load attached to the first and second efracking transformers.

In another particular illustrative embodiment of the invention, the mobile efracking power supply system further includes a processor in data communication with a non-transitory computer readable medium; an efracking power supply system for servicing an electrical fracking operation, the efracking power supply system a first and second efracking transformer, a first and second cooling fan that forces chilled air into the first and second efracking transformer, a first and second inverter attached to the first and second efracking transformer; a computer program comprising instructions stored in the non-transitory computer readable medium that are executed by the processor, the computer program comprising, instructions to determine a current system load serviced by efracking power supply system first efracking transformer and the second efracking transformer provided from the efracking power supply system; instructions to determine a current operating state for the first and second efracking transformer, a speed of the first and second cooling fan, a temperature of the first and second efracking transformer, and a temperature of the first and second cooling fans; instructions to determine a new operating state for first and second efracking transformer, a speed of the first and second cooling fan, a temperature of the first and second efracking transformer, and a temperature of the first and second cooling fans; and instructions to replace the current operating state for the first and second efracking transformer, a speed of the first and second cooling fan, a temperature of the first and second efracking transformer, and a temperature of the first and second cooling fans to the new operating state for the first and second efracking transformer, a speed of the first and second cooling fan, a temperature of the first and second efracking transformer, and a temperature of the first and second cooling fans. In another particular illustrative embodiment of the invention, the mobile efracking power supply system further includes the operating state comprises a load on the first and second efracking transformer, a speed of the first and second cooling fan, a temperature of the first and second efracking transformer, and a temperature of the first and second cooling fans. In another particular illustrative embodiment of the invention, the mobile efracking power supply system further includes the computer program is a linear program. In another particular illustrative embodiment of the invention, the mobile efracking power supply system further includes the computer program is an expert system. In another particular illustrative embodiment of the invention, the mobile efracking power supply system further includes the computer program is a neural network.

In another particular illustrative embodiment of the invention, the mobile efracking power supply system further includes a computer readable medium contain instructions that are executed a processor in data communication with a non-transitory computer readable medium to control an efracking power supply system, comprising instructions stored in the non-transitory computer readable medium that are executed by the processor, the computer program comprising, instructions to determine a current system load serviced by efracking power supply system first efracking transformer and the second efracking transformer provided from the efracking power supply system; instructions to determine a current operating state for the first and second efracking transformer, a speed of the first and second cooling fan, a temperature of the first and second efracking transformer, and a temperature of the first and second cooling fans; instructions to determine a new operating state for first and second efracking transformer, a speed of the first and second cooling fan, a temperature of the first and second efracking transformer, and a temperature of the first and second cooling fans; and instructions to replace the current operating state for the first and second efracking transformer, a speed of the first and second cooling fan, a temperature of the first and second efracking transformer, and a temperature of the first and second cooling fans to the new operating state for the first and second efracking transformer, a speed of the first and second cooling fan, a temperature of the first and second efracking transformer, and a temperature of the first and second cooling fans.

In another particular illustrative embodiment of the invention, the mobile efracking power supply system further includes the operating state comprises a the first and second efracking transformer, a speed of the first and second cooling fan, a temperature of the first and second efracking transformer, and a temperature of the first and second cooling fans to the new operating state for the first and second efracking transformer, a speed of the first and second cooling fan, a temperature of the first and second efracking transformer, and a temperature of the first and second cooling fans. In another particular illustrative embodiment of the invention, the mobile efracking power supply system further includes the computer program is an expert system.

In another particular illustrative embodiment of the invention, the mobile efracking power supply system further includes an electric fracking power supply system is disclosed including but not limited to an efracking trailer, wherein the trailer is two thirds smaller and lighter than a trailer for a standard high efficiency transformer; a first low efficiency efracking six mega volt ampere (MVA) transformer attached to the efracking trailer, wherein the efracking transformer is one third the size and weight a high efficiency electrical 6 MVA transformer; a second low efficiency efracking six mega volt ampere (MVA) transformer attached to the efracking trailer, wherein the efracking transformer is one third the size and weight a high efficiency electrical 6 MVA transformer; a processor in the efracking transformer, wherein the processor executes a linear computer program stored in a non-transitory computer program in the processor; an efracking transformer core inside of the efracking transformer; and a cooling fan attached to the efracking trailer, wherein the cooling fan forces chilled air into the efracking transformer core.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in at least one printed publication, dictionary, or issued patent.

Certain specific embodiments of methods, structures, elements, and parts are described below, which are by no means an exclusive description of the inventions. Other specific embodiments, including those referenced in the drawings, are encompassed by this application and any patent that issues therefrom.

The invention claimed is:

1. An electric fracking (efracking) power supply system comprising:
   an efracking trailer, wherein the trailer is smaller and lighter than a trailer for a high efficiency transformer trailer, configured to make the efracking trailer maneuverable in an oil filed, wherein, a fifty foot, five axel trailer required for a standard electrical transformer that weighs, 5,000 pounds is reduced to a twenty-five foot, two axel trailer the weighs only 1,700 pounds;
   a 70 percent efficiency efracking six mega volt ampere (MVA) transformer attached to the efracking trailer, wherein the efracking transformer is one third the volume, size, and weight of a 95 percent efficiency electrical 6 MVA transformer;
   an efracking transformer core inside of the efracking transformer; and
   a cooling fan attached to the efracking trailer, wherein the cooling fan forces chilled air into the efracking transformer core.

2. The electric fracking power supply system of claim 1, further comprising:
   a power utility grid attached to an input of the efracking transformer; and
   an electrical fracking equipment attached to an output of the efracking power supply system.

3. The electric fracking power supply system of claim 1, wherein number 18 American wire gauge transformer windings are wound onto the efracking transformer core.

4. The electric fracking power supply system of claim 1, further comprising: air gaps formed in the efracking transformer core, wherein the cooling fan attached to the efracking trailer forces chilled air into the air gaps formed in the efracking transformer core.

5. The electric fracking power supply system of claim 1, wherein the cooling fan is a high horse power fan that blows outdoor ambient air at 45 degrees centigrade onto the electric fracking core at 175 degrees centigrade.

6. The electric fracking power supply system of claim 1, further comprising:
   an electric utility grid that supplies alternating current to the electric fracking trailer.

7. The electric fracking power supply of claim 6, further comprising:
   a diode rectifier that corrects for voltage droop created by the electric fracking transformer.

8. The electric fracking power supply system of claim 1, further comprising:
   a second low efficiency efracking transformer; and
   a processor attached to the first and second efracking transformers, the processor further comprising a non-transitory computer readable medium containing a computer program comprising instructions that are executed by the processor.

9. The electric fracking power supply system of claim 8, wherein
   the computer program further comprises a linear program that adjusts the output of the first and second efracking transformers based on a load attached to the first and second efracking transformers.

10. The electric fracking power supply system of claim 8, wherein
    the computer program further comprises a linear program that adjusts the output of the cooling fans attached to the first and second efracking transformers based on a load attached to the first and second efracking transformers.

11. The electric fracking power supply system of claim 1, further comprising:
    a processor in data communication with a non-transitory computer readable medium, attached to the electric fracking power supply system, the electric power supply system
    comprising a first and second efracking transformer, a first and second cooling fan that forces chilled air into the first and second efracking transformer, a first and second inverter attached to the first and second efracking transformer;
    a computer program comprising instructions stored in the non-transitory computer readable medium that are executed by the processor, the computer program comprising,
    instructions to determine a current system load serviced the first efracking transformer and the second efracking transformer provided from the efracking power supply system;
    instructions to determine a current operating state for the first and second efracking transformers, a speed of the first and second cooling fan, a temperature of the first and second efracking transformer, and a temperature of the first and second cooling fans;
    instructions to determine a new operating state for the first and second efracking transformers, a speed of the first and second cooling fan, a temperature of the first and second efracking transformer, and a temperature of the first and second cooling fans; and
    instructions to replace the current operating state for the first and second efracking transformer, a speed of the first and second cooling fan, a temperature of the first and second efracking transformer, and a temperature of the first and second cooling fans to the new operating state for the first and second efracking transformer, a speed of the first and second cooling fan, a temperature of the first and second efracking transformer, and a temperature of the first and second cooling fans.

12. The electric fracking power supply system of claim 11, wherein the operating state comprises a load on the first and second efracking transformer, a speed of the first and second cooling fan, a temperature of the first and second efracking transformer, and a temperature of the first and second cooling fans.

13. The electric fracking power supply system of claim 12, wherein the computer program is a linear program.

14. The electric fracking power supply system of claim 12, wherein the computer program is an expert system.

15. The electric fracking power supply system of claim 12, wherein the computer program is a neural network.

16. A non-transitory computer readable medium containing instructions that are executed by a processor in data communication with the non-transitory computer readable medium to control an efracking power supply system, comprising instructions stored in the non-transitory computer readable medium that are executed by the processor, the instructions comprising,
    instructions to determine a current system load serviced by efracking power supply system first efracking transformer and the second efracking transformer provided from the efracking power supply system;
    instructions to determine a current operating state for the first and second efracking transformer, a speed of the first and second cooling fan, a temperature of the first and second efracking transformers, and a temperature of the first and second cooling fans;

instructions to determine a new operating state for the first and second efracking transformer, the speed of the first and second cooling fan, the temperature of the first and second efracking transformer, and the temperature of the first and second cooling fans; and instructions to replace the current operating state for the first and second efracking transformer, a speed of the first and second cooling fan, a temperature of the first and second efracking transformer, and a temperature of the first and second cooling fans to the new operating state for the first and second efracking transformer, a speed of the first and second cooling fan, a temperature of the first and second efracking transformer, and a temperature of the first and second cooling fans.

17. The medium of claim 16, wherein the operating state comprises a first and second efracking transformer, a speed of the first and second cooling fan, a temperature of the first and second efracking transformer, and a temperature of the first and second cooling fans to the new operating state for the first and second efracking transformer, a speed of the first and second cooling fan, a temperature of the first and second efracking transformer, and a temperature of the first and second cooling fans.

18. The medium of claim 16, wherein the computer program is an expert system.

19. An electric fracking power supply system comprising:
   an efracking trailer;
   a first 70 percent efficiency efracking six mega volt ampere (MVA) transformer attached to the efracking trailer;
   a second 70 percent efficiency efracking six mega volt ampere (MVA) transformer attached to the efracking trailer;
   a processor in the efracking transformer, wherein the processor executes a linear computer program stored in a non-transitory computer program in the processor;
   an efracking transformer core inside of the efracking transformer; and
   a cooling fan attached to the efracking trailer, wherein the cooling fan forces chilled air into the efracking transformer core.

\* \* \* \* \*